Nov. 6, 1928.
C. C. CALKINS
1,690,718
SEED TREATING MACHINE
Filed Sept. 12, 1924
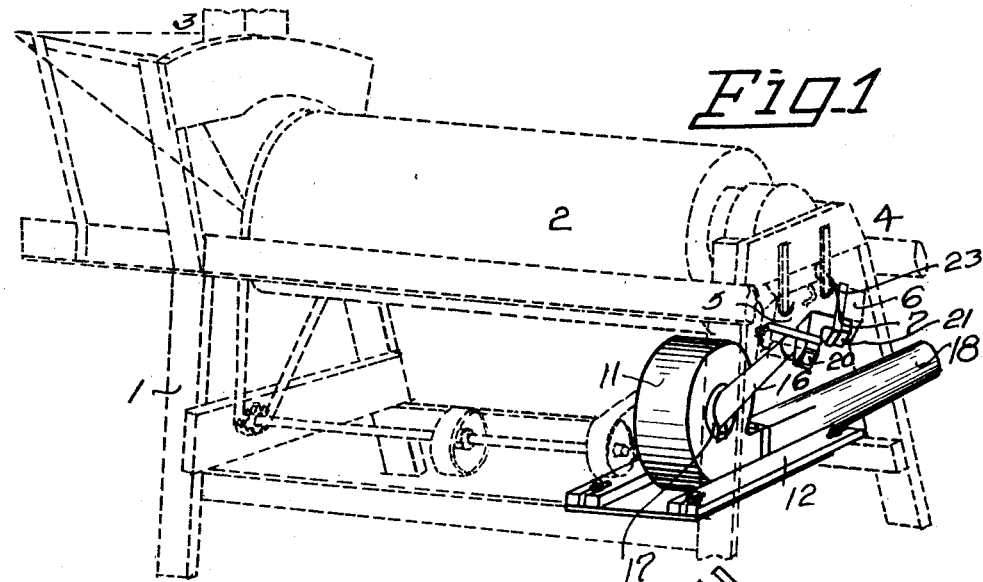
*Fig.1*
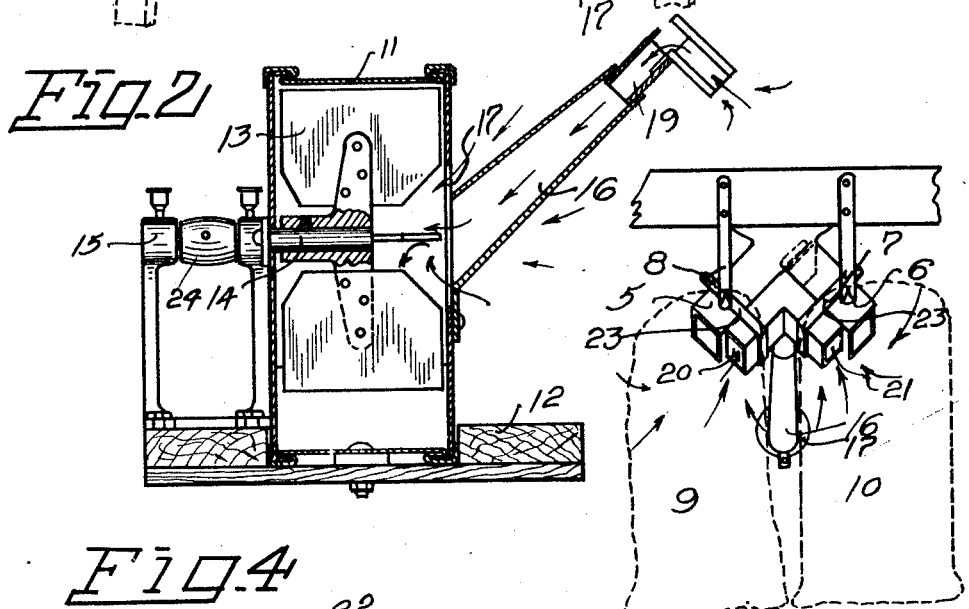
*Fig.2*
*Fig.3*
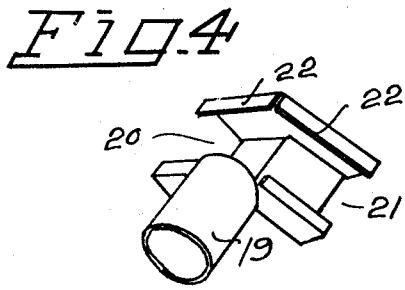
*Fig.4*
Inventor
Claude C. Calkins
H. E. Smith
Attorney Patented Nov. 6, 1928.

1,690,718

UNITED STATES PATENT OFFICE.

CLAUDE C. CALKINS, OF SPOKANE, WASHINGTON.

SEED-TREATING MACHINE.

Application filed September 12, 1924. Serial No. 737,284.

My present invention relates to improvements in seed treating machines wherein the seed or grains for planting are treated or coated with a powder as a preservative against disease as smut which attacks the seed or grain after planting. The fine dust accompanying the powders usually employed is of such nature that if permitted to enter the lungs of the attendant or operator of the machine, or other person, it has a very deleterious effect.

The primary object of my invention is the provision of a pneumatic attachment for these seed treating machines by means of which the excess powder or dust may be gathered at the seed discharge end of the machine, conveyed away, and disposed of at a suitable distant point, as at the outside of the building in which the machine is operating.

By the utilization of the attachment of my invention a device is provided which is comparatively inexpensive in cost of production, simple in construction and operation, and is efficient in the performance of its functions.

The invention consists in certain novel combinations and arrangements of parts of the attachment as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a view in perspective showing in dotted lines a well known type of seed treating machine, with the device of my invention attached to said machine in operative position and shown in full lines.

Figure 2 is an enlarged, vertical sectional view of the fan blower and attachment.

Figure 3 is a view showing the seed discharge spouts, with seed bags in dotted lines, and illustrating the relation of the dust gathering, pneumatic head.

Figure 4 is a view of the pneumatic head, detached, as viewed from its inner side.

In order that the general assembly and relation of parts may readily be understood I have shown a conventional form of seed treating machine supported on a frame 1, and indicated at 2 the rotary type of seed treating machine wherein the seed and powder are mixed, the seed and powder being supplied at the feed end 3 and the coated seed being discharged at the rear end 4 of the machine.

A pair of angularly disposed, diverging discharge spouts 5 and 6 are secured to the frame of the machine by straps 7 and 8, and the treated grain is discharged through these spouts to the respective gathering bags 9 and 10 shown in dotted lines in Figure 3. At the discharge end of the machine, the unconfined excess powder and fine dust of the treating element are caught or gathered by the utilization of the device of my invention, and thus prevented from permeating the atmosphere at this point.

My attachment for gathering the dust includes a fan blower casing 11, supported below and at one side of the machine on a frame 12, in which the fan or blast wheel 13 is enclosed.

The fan shaft 14 is journaled in bearings 15, and the blower, which is of the centrifugal type with bottom horizontal discharge is provided with a central intake pipe 16 around which is also provided an opening 17 for gathering dust adjacent to the opening, as indicated by the arrows in Figure 2. The gathered dust is air-swept through the bottom horizontal discharge pipe 18 from the fan casing to the exterior of the building containing the machine and freed to the atmosphere, or if desired means may be provided for the recovery of this excess dust and powder.

At the upper free end of the intake pipe 16 I provide a telescoping, adjustable, pneumatic head, for gathering the dust, and through which head the gathered dust is passed, and conveyed through the intake pipe to the blower. The intake head is fashioned with a sleeve 19, circular in this instance to conform to the shape of the intake pipe 16 into which it telescopes and within which it may be adjusted to proper position.

The head is fashioned with a pair of angularly disposed dust gatherers 20 and 21 integral with the sleeve and open thereto. These dust gatherers are in the form of rectangular boxes with open outer ends, and each has an open face or side bounded by flanges 22. The boxes are rectangular in cross section and disposed at approximately the same angle as the two diverging spouts 5 and 6 of the discharge end of the machine. The angular boxes are designed to fit in between the diverging spouts with their open faces against the outer walls of the spouts, and attaching straps 23 on the boxes are employed to secure the boxes to the spouts. The boxes thus form open end intakes for gathering the dust from the upper ends of the bags 9 and 10, which as seen in Fig. 3 enclose the ends of the boxes and spouts. While the suction of the fan is sufficient to gather the dust from the tops of the bags, it is not sufficient to affect the movement of the treated seed as they are discharged into the bags, and in this manner the dust is separated from the seeds and suitably disposed of.

The fan blower may be operated from the operating parts of the seed treating machine through a belt passing over the pulley 24.

It will be noted in Figure 3 that the boxes 20 and 21 are slightly shorter than the spouts 5 and 6, i. e. the open ends of the boxes terminate back of the open ends of the spouts thus decreasing the likelihood of the draft or suction of air affecting the movement of the grain or seed. Any dust escaping from the bags or sacks would be gathered to the fan casing through the intake opening 17 of the fan casing which is located sufficiently close to the discharge end of the machine to accomplish this purpose.

Having thus fully described my invention, what I claim as new and desire to secure by Letters Patent is—

1. In a seed treating machine having a pair of angularly disposed discharge spouts, the combination of a fan blower and its intake pipe, a pneumatic head having a sleeve telescoping with said pipe, a pair of angularly disposed intake boxes integral with said sleeve and forming part of the head, said boxes having open inner faces for engagement with the outer walls of said spouts, flanges on said inner faces, and means for attaching said boxes to said spouts.

2. In a seed treating machine the combination with a pair of angularly disposed rectangular spouts, of a pneumatic head comprising a pair of angularly disposed intake boxes having open flanged walls adjacent and contacting with complementary walls of the angular spouts, attaching straps for securing said boxes to said spouts, a fan blower and an intake pipe therefor, and a sleeve on said head telescoping with the free end of said intake pipe.

In testimony whereof I affix my signature.

CLAUDE C. CALKINS.